US010610962B2

(12) United States Patent
Kaiser

(10) Patent No.: US 10,610,962 B2
(45) Date of Patent: Apr. 7, 2020

(54) METHODS AND APPARATUS FOR SPOT WELDING WORKPIECES USING LASER PULSES

(71) Applicant: TRUMPF LASER GMBH, Schramberg (DE)

(72) Inventor: Elke Dolores Kaiser, Aichhalden (DE)

(73) Assignee: TRUMOF LASER GMBH, Schramberg (DE)

( * ) Notice: Subject to any disclaimer, the term of this patent is extended or adjusted under 35 U.S.C. 154(b) by 774 days.

(21) Appl. No.: 15/223,308

(22) Filed: Jul. 29, 2016

(65) Prior Publication Data

US 2016/0332254 A1 Nov. 17, 2016

Related U.S. Application Data

(63) Continuation of application No. PCT/EP2015/050470, filed on Jan. 13, 2015.

(30) Foreign Application Priority Data

Jan. 31, 2014 (DE) .................. 10 2014 201 715

(51) Int. Cl.
*B23K 26/0622* (2014.01)
*B23K 26/22* (2006.01)
(Continued)

(52) U.S. Cl.
CPC ...... *B23K 26/0622* (2015.10); *B23K 26/0006* (2013.01); *B23K 26/064* (2015.10);
(Continued)

(58) Field of Classification Search
CPC .......................... B23K 26/0622; B23K 26/626
(Continued)

(56) References Cited

U.S. PATENT DOCUMENTS 8,598,490 B2   12/2013 Hooper et al.
2012/0325787 A1* 12/2012 Hamada ................ B23K 9/167
                                                    219/121.64
2013/0134139 A1*  5/2013 Duerr ................. B23K 26/0622
                                                    219/121.63

FOREIGN PATENT DOCUMENTS

CN    103108721 A    5/2013
CN    103477427 A   12/2013
(Continued)

OTHER PUBLICATIONS

Korean Office Action in Application No. 10-2016-7020586, dated Feb. 9, 2018, 14 pages (with English translation).
(Continued)

*Primary Examiner* — Serkan Akar
*Assistant Examiner* — Spencer H. Kirkwood
(74) *Attorney, Agent, or Firm* — Fish & Richardson P.C.

(57) ABSTRACT

A laser welding method includes guiding laser pulses to a workpiece surface of workpieces and adjusting a power of the laser pulses according to a time pulse curve to spot weld the workpieces together. The time pulse curve has a first pulse section having a rising pulse flank for generating a melting temperature and subsequently a vaporization temperature in the workpieces, a second pulse section for melt bath generation having a vapor channel in the workpieces, a third pulse section having a pulse flank which initially drops vertically to at least ¾ of the power at an end of the second pulse section and subsequently drops more flatly for reversion of the vapor channel, and a fourth pulse section having a low pulse plateau and a level of between ⅓ and ¼ of the power at the end of the second pulse section for oscillation of the melt.

22 Claims, 2 Drawing Sheets

(51) Int. Cl.
*B23K 26/32* (2014.01)
*B23K 26/064* (2014.01)
*B23K 26/00* (2014.01)
B23K 103/08 (2006.01)
B23K 103/12 (2006.01)

(52) U.S. Cl.
CPC .............. *B23K 26/22* (2013.01); *B23K 26/32* (2013.01); *B23K 2103/08* (2018.08); *B23K 2103/12* (2018.08)

(58) Field of Classification Search
USPC ..................................................... 219/121.61
See application file for complete search history.

(56) References Cited

FOREIGN PATENT DOCUMENTS

| | | | |
|---|---|---|---|
| DE | 102007038502 B2 | 1/2013 | |
| EP | 0674965 A1 * | 10/1995 | ........... B23K 26/032 |
| EP | 2392429 A1 | 12/2011 | |
| JP | 0550278 A | 3/1993 | |
| JP | H 10202380 | 8/1998 | |
| JP | 2002-273586 | 9/2002 | |
| JP | 2005169395 | 6/2005 | |
| JP | 2005288481 A | 10/2005 | |
| JP | 2006-339451 | 12/2006 | |
| JP | 2013-513486 | 4/2013 | |
| KR | 1020130071463 | 6/2013 | |
| RU | 2269401 C2 | 2/2006 | |
| WO | WO2009021716 A1 | 2/2009 | |
| WO | WO 2013/171848 | 11/2013 | |

OTHER PUBLICATIONS

Engler et al., "Process Studies on Laser Welding of Copper with Brilliant Green and Infrared Lasers", Physics Procedia, vol. 12, pp. 339-346, 2011.
Nakashiba et al., "Micro-welding of Copper Plate by Frequency Doubled Diode Pumped Pulsed Nd: YAG Laser", Physics Procedia, vol. 39, 8 pages, 2012.
International Search Report from corresponding PCT Application No. PCT/EP2015/050470, dated Jul. 15, 2015, 4 pages.
Notification of Transmittal of Translation of the International Preliminary Report on Patentability and Written Opinion of the International Searching Authority for corresponding PCT Application No. PCT/EP2015/050470, dated Aug. 2, 2016, 8 pages.
JP Notice of Allowance in Japanese Appln. No. 2016-549361, dated Aug. 7, 2017, 4 pages (with English translation).

* cited by examiner

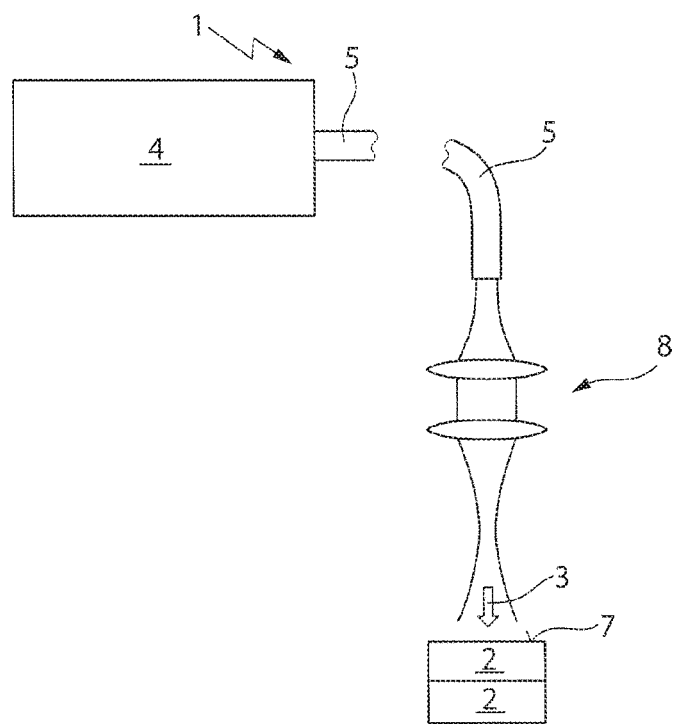
Fig. 1A
Fig. 1B
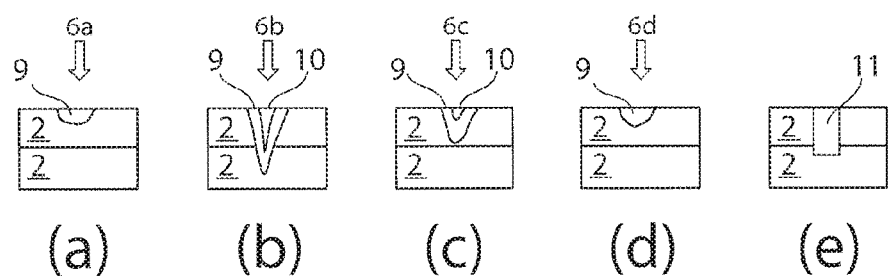
Fig. 3

METHODS AND APPARATUS FOR SPOT WELDING WORKPIECES USING LASER PULSES

CROSS-REFERENCE TO RELATED APPLICATIONS

This application is a continuation of and claims priority under 35 U.S.C. § 120 to PCT Application No. PCT/EP2015/050470 filed on Jan. 13, 2015, which claims priority to German Application No. DE 10 2014 201 715.7, filed on Jan. 31, 2014. The entire contents of these priority applications are incorporated herein by reference.

TECHNICAL FIELD

The present invention relates to methods and apparatus for spot welding workpieces, particularly made of copper, copper alloys, gold, or jewelry materials, using laser pulses, particularly having a wavelength of 500 to 540 nm.

BACKGROUND

The absorption of copper and gold is higher in the case of green wavelengths (500 to 540 nm) than for the wavelength of common laser types (≥1064 nm). In the laser welding of copper using laser pulses having infrared (IR) wavelength (1064 nm), the power of the laser pulse typically has a trapezoidal time pulse curve having a linearly rising pulse flank for generating a melting temperature and subsequently a vaporization temperature in the workpiece, a level pulse plateau for melt bath generation having a vapor channel in the workpiece, and a linearly falling pulse flank for ending the welding procedure. However, the welded workpiece surface has molten material spatters. In laser welding using so-called hybrid lasers, welding is performed simultaneously using laser pulses having IR wavelength (1064 nm) and having green wavelength (532 nm), to thus improve the energy coupling into the copper material. For so-called micro-weld bonds of copper, laser pulses having green wavelength (500 to 540 nm) are used, wherein the welding penetration depths are at most approximately 0.2 mm.

Users sometimes have new (e.g., glossy) copper parts and sometimes have copper parts which are days or weeks old (e.g., oxidized). Therefore, the processing parameters have to be adapted to the age of the workpieces and/or to the surface composition in IR laser processing. In addition, the coupling of IR laser radiation varies so strongly within a newly ground surface of copper that spot weld differences occur.

SUMMARY

One aspect of the invention features a laser welding method of spot welding workpieces using laser pulses, comprising: guiding the laser pulses to a workpiece surface of the workpieces; and chronologically adjusting a power of the laser pulses according to a time pulse curve to spot weld the workpieces together. The power of the laser pulses has in each case a time pulse curve having a chronologically first pulse section in the form of a rising pulse flank for generating a melting temperature and subsequently a vaporization temperature in the workpiece, having a main pulse section as the chronologically second pulse section in the form of a high pulse plateau for melt bath generation having a vapor channel in the workpiece, having a chronologically third pulse section in the form of a pulse flank, which initially drops vertically to at least ¾ of the power at the end of the high pulse plateau and subsequently drops more flatly, for reversion of the vapor channel, and having a chronologically fourth pulse section in the form of a low pulse plateau, the level of which is between ⅓ and ¼ of the power at the end of the high pulse plateau, for oscillation of the melt.

The laser welding method can use green laser pulses having a wavelength from 500 to 540 nm to achieve spot welds having the most uniform possible size (welding penetration depth and width)—in particular at a welding penetration depth of 0.5 to 1.3 mm—and to avoid spatters on the workpiece surface and to achieve a welding penetration depth and spot width which are as independent as possible from the workpiece surface. The laser welding method can be suitable for all materials which absorb particularly well at green wavelengths. In some cases, the workpieces can be made of copper, copper alloys, gold, or jewelry materials.

In some cases, the power of the laser pulse can have a square-wave or trapezoidal time pulse curve. In some cases, in the time pulse curve, the power of the laser pulses, e.g., green laser pulses, thus does not have a square-wave or trapezoidal time pulse curve as in the IR laser pulses, but rather the pulse power initially drops vertically at the end of the high pulse plateau and subsequently drops more flatly, to thus revert the vapor channel over a longer period of time, and then merges into a low pulse plateau, whereby the cooling and solidification of the melt, i.e., the oscillation of the melt, is lengthened over a longer time. The delayed vapor channel reversion and the delayed oscillation of the melt counteract eruptions of the melt, so that no or fewer spatters occur on the workpiece surface. The heat flow into the material and back is therefore determined by a special chronologically adapted power curve of the laser pulses.

The main pulse section is preferably designed as a horizontal pulse plateau or rising pulse plateau and is to be selected as sufficiently high for all welding penetration depths so that in particular no spatters occur. The longer the duration of the second main pulse section, the greater the welding penetration depth. The pulse power or pulse peak power at the end of the pulse plateau is strongly dependent on the focal position.

The rising pulse flank of the first pulse section preferably has a greater slope at the flank beginning than at the flank end. The curve therefore follows the natural energy coupling into the workpiece. That is to say, a steeper curve would also not be absorbed differently in the material, and the energy provided would be wasted. The low slope at the flank end therefore results in an energy saving of the laser pulse. Since the absorption rises suddenly upon the phase change from liquid to vaporized phase due to the occurring multiple reflections in the vapor channel, as soon as the vaporization temperature has been reached in the workpiece, the further power increase required for generating the vapor channel can be performed more slowly or linearly.

As experiments have shown, the duration of the third and the fourth pulse sections is essentially independent of the duration of the preceding pulse sections. Instead, it is dependent on the depth of the vapor channel. The duration of the third pulse section is preferably between approximately 0.3 ms and approximately 4 ms and the minimum duration of the fourth pulse section is preferably between approximately 0.5 ms and approximately 3 ms. Longer durations of the fourth pulse section are possible, but have no effect.

The laser pulses are particularly preferably each imaged on the workpiece surface with a bell-shaped power density distribution, which results on the workpiece surface in a gradual, i.e., not abrupt temperature profile which drops from the inside toward the outside. This soft temperature drop toward the outside counteracts eruptions of the melt, so that no or fewer spatters occur on the workpiece surface. The vapor channel forms in accordance with the temperature distribution and offers a uniform, inclined absorption surface for the laser light.

To achieve this power density distribution on the workpiece surface, the laser pulses, which are guided in an optical fiber to the workpiece, are preferably expanded to at least twice to four times the fiber diameter after the exit thereof from the optical fiber, before the laser pulses are incident on the workpiece surface.

In one variant, the diameter expansion of the laser pulses, which exited with top-hat distribution from the optical fiber, is performed by correspondingly broad arrangement of the focus of the laser pulses above or below the workpiece surface, i.e., by defocusing of the laser pulses on the workpiece surface, or by an expansion optical system, which intentionally generates such a power density distribution, or by the use of a gradient index fiber.

Another aspect of the invention features a laser welding apparatus for carrying out the spot-welding method according to the invention. The laser welding apparatus includes a laser beam generator for generating laser pulses and an optical arrangement for guiding the laser pulses from the laser beam generator to a workpiece surface of the workpieces. The laser pulses can have a wavelength of 500 to 540 nm and a main pulse section that lasts between approximately 1 ms and approximately 20 ms. The laser pulses can have a pulse peak power between approximately 1600 W and approximately 6000 W in the main pulse section.

The laser beam generator is configured to chronologically adjust the power of the laser pulses according to a time pulse curve. The time pulse curve has a chronologically first pulse section in the form of a rising pulse flank for generating a melting temperature and subsequently a vaporization temperature in the workpiece, the main pulse section has a chronologically second pulse section in the form of a high pulse plateau for melt bath generation having a vapor channel in the workpiece, a chronologically third pulse section in the form of a pulse flank, which initially drops vertically to at least ¾ of the power at the end of the high pulse plateau and subsequently drops more flatly, for reversion of the vapor channel, and a chronologically fourth pulse section in the form of a low pulse plateau, the level of which is between ⅓ and ¼ of the power at the end of the high pulse plateau, for oscillation of the melt.

In one preferred embodiment, the optical arrangement includes an optical fiber provided for guiding the laser pulses from the laser beam generator to the workpiece. The optical fiber can be a stepped index fiber, for example, from which the laser pulses exit having a top-hat profile.

In one refinement, the optical arrangement includes a focusing optical system, for example, in the form of lenses, arranged downstream from the optical fiber, which optical system images the diameter in the focus in the case of top-hat distribution on at most the same or smaller fiber diameter. The irradiation diameter is expanded by defocusing to at least twice to four times the fiber diameter. In an alternative refinement, the bell-shaped distribution can also be imaged by a downstream focusing optical system, for example, in the form of lenses, the property of which is to generate, in the focus, a power density distribution which is changed in relation to the optical fiber. The irradiation diameter is then between 0.2 and 0.8 mm, and the workpiece is in the vicinity of the focus.

Further advantages of the invention result from the claims, the description, and the drawing. The above-mentioned features and the features set forth hereafter can also each be used per se or in a plurality in arbitrary combinations. The embodiments which are shown and described are not to be understood as an exhaustive list, but rather have exemplary character for the description of the invention.

DESCRIPTION OF DRAWINGS

FIG. 1A shows an example laser welding apparatus according to the invention for spot welding using laser pulses.

FIG. 1B shows an example positional power density distribution of the laser pulses of FIG. 1A on a workpiece surface.

FIG. 3 shows various phases during spot-welding according to the invention.

DETAILED DESCRIPTION

Figure 2A:
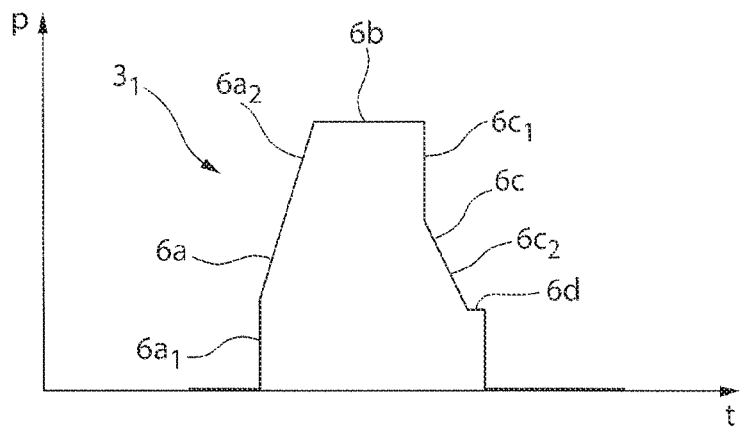
FIGS. 2A, 2B and 2C show the time pulse curve of the power of various laser pulses according to the invention for spot welding a workpiece having a welding penetration depth of 0.8 mm (FIG. 2A), 1 mm (FIG. 2B), and 1.3 mm (FIG. 2C).

In the following description of the drawing, identical reference signs are used for identical or functionally identical components.

A laser welding apparatus 1 shown in FIG. 1A is used for spot welding two workpieces 2, in particular made of copper, copper alloys, gold, or jewelry materials, using laser pulses 3, in particular having a green wavelength of 500 to 540 nm. The laser welding apparatus 1 comprises a laser beam generator 4, for generating the laser pulses 3, and an optical fiber 5, which guides the laser pulses 3 from the laser beam generator 4 to the workpiece 2. The laser beam generator 4 can be a frequency-doubled solid-state laser, for example, a Nd:YAG laser having a wavelength of 1064 nm, which emits a green wavelength of 532 nm after the frequency doubling. The optical fiber 5 can be, for example, a stepped index fiber, from which the laser pulses 3 exit with a top-hat profile. The laser pulses 3 have pulse durations between 1 ms and 20 ms, a pulse power between 0.5 kW and 6 kW, and a mean power between single pulse between 0 and 600 W.

Figure 2B:
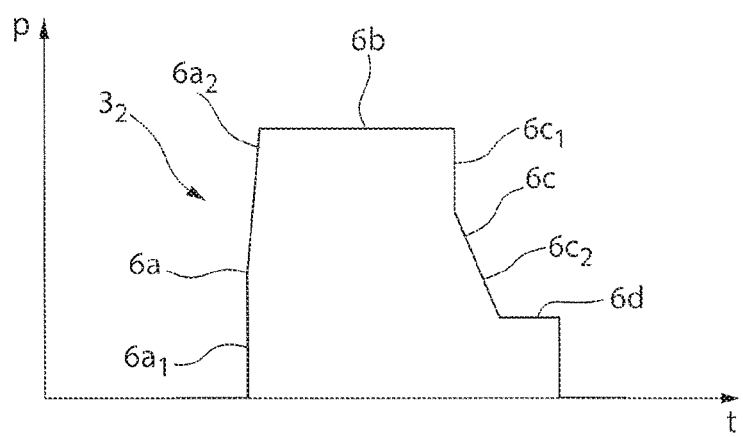
Figure 2C:
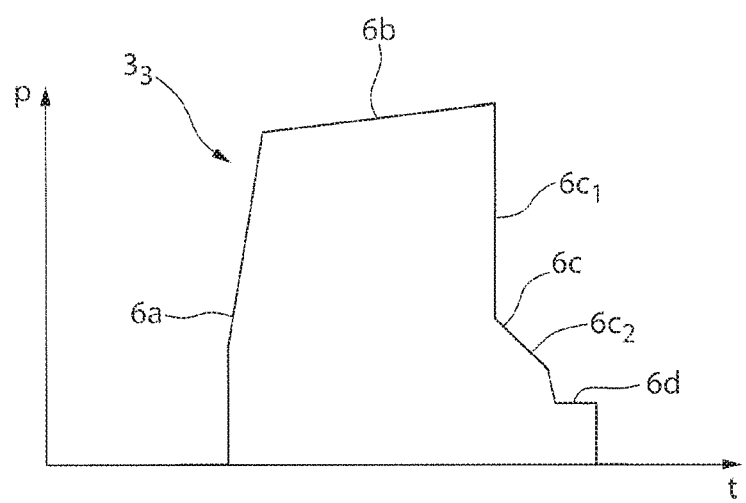

FIGS. 2A-2C show the time pulse curve of the power of different laser pulses $3_1$, $3_2$, $3_3$, which are generated by the laser welding apparatus 1 for laser welding at different welding penetration depths. FIG. 2A shows the time pulse curve of the laser pulse $3_1$ for a welding penetration depth of 0.8 mm, FIG. 2B shows the time pulse curve of the laser pulse $3_2$ for a welding penetration depth of 1 mm, and FIG. 2C shows the time pulse curve of the laser pulse $3_3$ for a welding penetration depth of 1.3 mm.

The time pulse curve of the laser pulses $3_1$, $3_2$, $3_3$ comprises a chronologically first pulse section 6a in the form of a rising pulse flank to generate a melting temperature and subsequently a vaporization temperature in the workpiece 2, a chronologically second pulse section (main pulse section) 6b in the form of a high pulse plateau for melt bath generation having a vapor channel ("keyhole") in the workpiece 2, a chronologically third pulse section 6c in the form of a pulse flank, which initially drops vertically to at least ¾ of the power at the end of the high pulse plateau and subsequently drops more flatly, for the reversion of the vapor channel, and a chronologically fourth pulse section 6d in the form of a low pulse plateau, the height of which is between ⅓ and ¼ of the power at the end of the high pulse plateau, for oscillation of the melt.

In the laser pulses $3_1$ and $3_2$, the rising pulse flank of the first pulse section $6a$ has two flank parts $6a1$, $6a2$ having different slopes, namely a steeply rising first flank section $6a1$ for generating the melting temperature and a less steeply rising second flank section $6a2$ for generating the vaporization temperature in the workpiece 2. In contrast, in the laser pulse $3_3$, the rising pulse flank of the first pulse section $6a$ has the same slope throughout.

The rising pulse flank of the first pulse section $6a$ then merges into the high pulse plateau of the main pulse section $6b$, specifically either in a horizontal plateau as in the laser pulses $3_1$, $3_2$, or in a rising plateau as in the laser pulse $3_3$. The longer the duration of the main pulse section $6b$, the greater the welding penetration depth. The duration of the main pulse section is preferably between approximately 1 ms and approximately 20 ms. The pulse power at the end of the high pulse plateau is strongly dependent on the focal position and is preferably between 1600 W and 6000 W.

In all laser pulses $3_1$, $3_2$, $3_3$, the third pulse section $6c$ has a flank section $6c1$, which drops vertically to at least ¾ of the power at the end of the high pulse plateau, and which then merges into a more flatly dropping flank section $6c2$. The duration of the third pulse section $6c$ is preferably between approximately 0.3 ms and approximately 4 ms and the minimum duration of the fourth pulse section $6d$ is preferably between approximately 0.5 ms and approximately 3 ms. Longer durations of the fourth pulse section $6d$ are possible, but have no effect.

As FIG. 1B shows, the laser pulses $3_1$, $3_2$, $3_3$ are imaged on the workpiece surface 7 using a bell-shaped power density distribution, which results on the workpiece surface 7 in a gradual, i.e., non-abrupt temperature profile which drops from the inside toward the outside. This soft temperature drop toward the outside counteracts eruptions of the melt, so that no or fewer spatters occur on the workpiece surface 7. To achieve this bell-shaped power density distribution on the workpiece surface 7, the laser pulses 3 are imaged defocused having a diameter expanded to at least twice to four times the fiber diameter on the workpiece surface 7. At a fiber diameter of approximately 100-200 μm, the laser pulses 3 are thus imaged at a diameter of 200-800 μm on the workpiece surface 7. An expansion optical system 8 (for example, a lens optical system having collimator and focusing lenses) is arranged between the optical fiber 5 and the workpiece 2. The diameter expansion of the laser pulses 3, which exit from the optical fiber 5 having top-hat distribution, is performed by corresponding arrangement of the focus of the laser pulses 3 well above the workpiece surface 7, i.e., by defocusing of the laser pulses 3 with respect to the workpiece surface 7.

FIG. 3 schematically shows the various phases (a) to (e) of the workpiece 2 during the spot-welding method according to the invention:

The upper workpiece 2 is firstly melted from the workpiece surface 7 by the incident first pulse section $6a$, so that a melt 9 arises (phase (a)), and the melt then also begins to vaporize.

The second pulse section $6b$ additionally forms a vapor channel ("keyhole") 10 in the melt 9 (phase (b)) and represents the actual main pulse for the melt bath generation. The vapor channel 10 extends down into the lower workpiece 2.

The main pulse is ended by the perpendicular pulse flank $6c1$ of the third pulse section $6c$, and the more flatly dropping pulse flank $6c2$ of the third pulse section $6c$ causes the vapor channel 10 to revert over a longer period of time (phase (c)) and thus fewer eruptions of the melt 9 and fewer spatters to occur.

Due to the low plateau of the fourth pulse section $6d$, the melt 9 is cooled over a longer period of time (phase (d)), whereby slow oscillation and solidification of the melt 9 without spatters is achieved (phase (e)).

The combination of positional and chronological temperature control, together with a reliable absorption of the energy in the workpiece 2 due to the wavelength of the laser, enables a laser welding method which generates spot welds 11, which are spatter-free and reproducible in size. As experiments have furthermore shown—in contrast to "infra-red" spot welds—the "green" spot welds 11 are independent of the condition of the workpiece surface and have a high level of diameter consistency. During laser welding, a different surface forms at the melting temperature, namely a very good and completely smooth mirror surface in the case of welding using IR laser radiation and a less good and curved mirror surface in the case of welding using green laser radiation, which is independent of the original surface condition.

A number of embodiments of the invention have been described. Nevertheless, it will be understood that various modifications may be made without departing from the spirit and scope of the invention. Accordingly, other embodiments are within the scope of the following claims.

What is claimed is:

1. A laser welding method of spot welding workpieces using laser pulses, comprising:
   guiding the laser pulses to a workpiece surface of the workpieces, wherein the laser pulses comprise only one single color and have a wavelength in a single wavelength range; and
   chronologically adjusting a power of the laser pulses according to a time pulse curve to spot weld the workpieces together,
   wherein a profile of the time pulse curve comprises:
      a chronologically first pulse section in a form of a rising pulse flank for generating a melting temperature and subsequently a vaporization temperature in the workpieces,
      a chronologically second pulse section as a main pulse section for melt bath generation having a vapor channel in the workpieces, the chronologically second pulse section being immediately after the chronologically first pulse section,
      a chronologically third pulse section in a form of a pulse flank which initially drops vertically to at least ¾ of the power at an end of the main pulse section and subsequently drops more flatly for reversion of the vapor channel, the chronologically third pulse section being immediately after the chronologically second pulse section, and
      a chronologically fourth pulse section in a form of a low pulse plateau and having a level of between ⅓ and ¼ of the power at the end of the main pulse section for oscillation of the melt, the chronologically fourth pulse section being an end pulse section of the profile of the time pulse curve and immediately after the chronologically third pulse section, the level of the chronologically fourth pulse section being larger than zero.

2. The laser welding method of claim 1, wherein the workpieces are made of copper, copper alloys, gold, or jewelry materials.

3. The laser welding method of claim 1, wherein the laser pulses comprise green color laser pulses and have the wavelength in the single wavelength range of 500 to 540 nm.

4. The laser welding method of claim 1, wherein the spot welding the workpieces together comprises generating a welding penetration depth greater than 0.5 mm in the workpieces.

5. The laser welding method of claim 4, wherein the welding generation depth is between 0.8 mm and 1.3 mm.

6. The laser welding method of claim 4, wherein the welding generation depth is greater than 1.3 mm.

7. The laser welding method of claim 1, wherein the main pulse section lasts between approximately 1 ms and approximately 20 ms, and
   wherein, in the main pulse section, the laser pulses have a pulse peak power between approximately 1600 W and approximately 6000 W.

8. The laser welding method of claim 1, wherein the main pulse section is designed as one of a horizontal pulse plateau and a rising pulse plateau.

9. The laser welding method of claim 1, wherein the rising pulse flank of the first pulse section has a greater slope at a beginning of the flank than at an end of the flank.

10. The laser welding method of claim 1, wherein the third pulse section lasts between approximately 0.3 ms and approximately 4 ms.

11. The laser welding method of claim 1, wherein the fourth pulse section has a minimum duration between approximately 0.5 ms and approximately 3 ms.

12. The laser welding method of claim 1, wherein guiding the laser pulses to a workpiece surface comprises:
   imaging the laser pulses on the workpiece surface, such that each of the imaged laser pulses has a bell-shaped positional power density distribution on the workpiece surface.

13. The laser welding method of claim 12, wherein imaging the laser pulses on the workpiece surface comprises:
   defocusing a focus having a top-hat distribution of the laser pulses to generate the bell-shaped positional power density distribution on the workpiece surface.

14. The laser welding method of claim 12, wherein imaging the laser pulses on the workpiece surface comprises:
   generating the bell-shaped positional power density via a lens optical system that generates a bell distribution on the workpiece in a focus from a top-hat distribution of the laser pulses.

15. The laser welding method of claim 1, wherein guiding the laser pulses to a workpiece surface comprises:
   guiding the laser pulses from an optical fiber to expand a diameter of the laser pulses to at least twice to four times of a dimeter of the optical fiber before the laser pulses are incident on the workpiece surface.

16. The laser welding method of claim 15, wherein guiding the laser pulses from the optical fiber to expand the diameter of the laser pulses comprises:
   expanding the diameter of the laser pulses exiting from the optical fiber by a corresponding arrangement of a focus of the laser pulses well above the workpiece surface.

17. A laser welding apparatus for laser welding workpieces, comprising:
   a laser beam generator configured to generate laser pulses, wherein the laser pulses comprise only one single color and have a wavelength in a single wavelength range; and
   an optical arrangement configured to guide only the laser pulses from the laser beam generator to a workpiece surface of the workpieces,
   wherein the laser beam generator is configured to chronologically adjust the power of the laser pulses according to a time pulse curve, a profile of the time pulse curve comprising:
      a chronologically first pulse section in a form of a rising pulse flank for generating a melting temperature and subsequently a vaporization temperature in the workpieces,
      a chronologically second pulse section as the main pulse section for melt bath generation having a vapor channel in the workpieces, the chronologically second pulse section being immediately after the chronologically first pulse section,
      a chronologically third pulse section in a form of a pulse flank, which initially drops vertically to at least ¾ of the power at an end of the main pulse section and subsequently drops more flatly for reversion of the vapor channel, the chronologically third pulse section being immediately after the chronologically second pulse section, and
      a chronologically fourth pulse section in a form of a low pulse plateau and having a level of between ⅓ and ¼ of the power at the end of the main pulse section for oscillation of the melt, the chronologically fourth pulse section being an end pulse section of the profile of the time pulse curve and immediately after the chronologically third pulse section, the level of the chronologically fourth pulse section being larger than zero.

18. The laser welding apparatus of claim 17, wherein the optical arrangement comprises an optical fiber for guiding the laser pulses from the laser beam generator to the workpiece surface.

19. The laser welding apparatus of claim 18, wherein the optical arrangement is configured such that the laser pulses are incident on the workpiece surface and defocused having a diameter expanded to at least twice to four times a diameter of the optical fiber.

20. The laser welding apparatus of claim 18, wherein the optical arrangement comprises an expansion optical system arranged downstream of the optical fiber and configured to expand a diameter of the laser pulses incident on the workpiece surface to at least twice to four times a diameter of the optical fiber.

21. The laser welding apparatus of claim 17, wherein the laser beam generator is configured to generate the laser pulses having the wavelength in the single wavelength range of 500 to 540 nm.

22. The laser welding apparatus of claim 17, wherein the laser beam generator is configured to generate laser pulses having a main pulse section that lasts between approximately 1 ms and approximately 20 ms, and
   wherein, in the main pulse section, the laser pulses have a pulse peak power between approximately 1600 W and approximately 6000 W.

* * * * *

UNITED STATES PATENT AND TRADEMARK OFFICE
CERTIFICATE OF CORRECTION

PATENT NO. : 10,610,962 B2  
APPLICATION NO. : 15/223308  
DATED : April 7, 2020  
INVENTOR(S) : Elke Dolores Kaiser Page 1 of 1

It is certified that error appears in the above-identified patent and that said Letters Patent is hereby corrected as shown below:

On the Title Page

(73) Assignee:, delete "TRUMOF LASER GMBH," and insert -- TRUMPF LASER GMBH, --

Signed and Sealed this
Sixteenth Day of June, 2020

Andrei Iancu
*Director of the United States Patent and Trademark Office*